Figure 1:
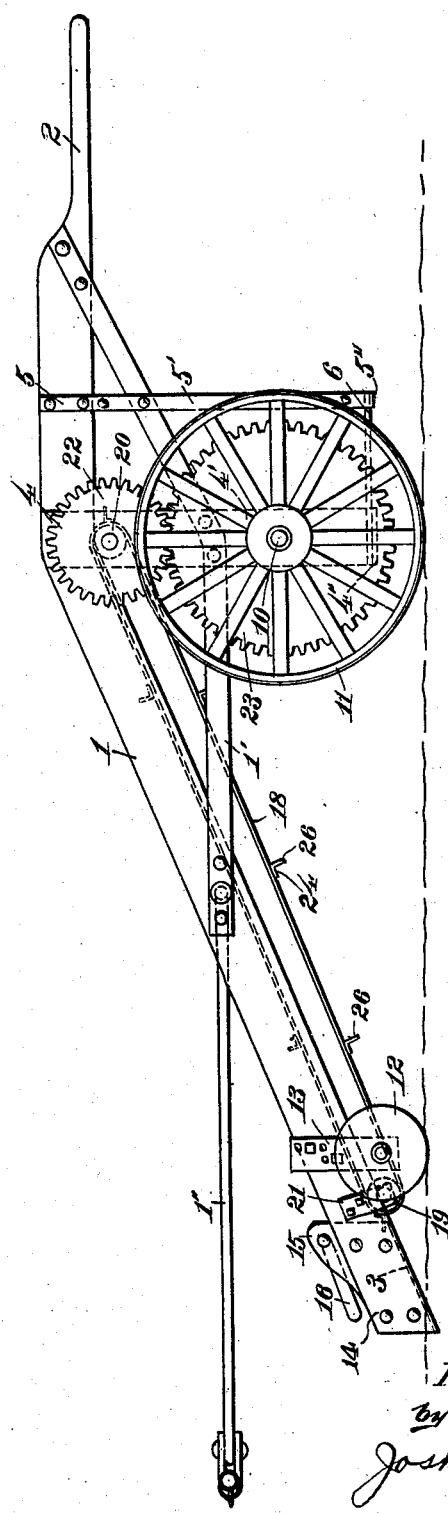

No. 889,653. PATENTED JUNE 2, 1908.
R. BLAIR.
POTATO DIGGER.
APPLICATION FILED SEPT. 16, 1907.

4 SHEETS—SHEET 1.

Witnesses:
H. J. Austin
F. E. Sheehy

Inventor:
Robert Blair,
by
Joshua R. H. Potts
Atty.

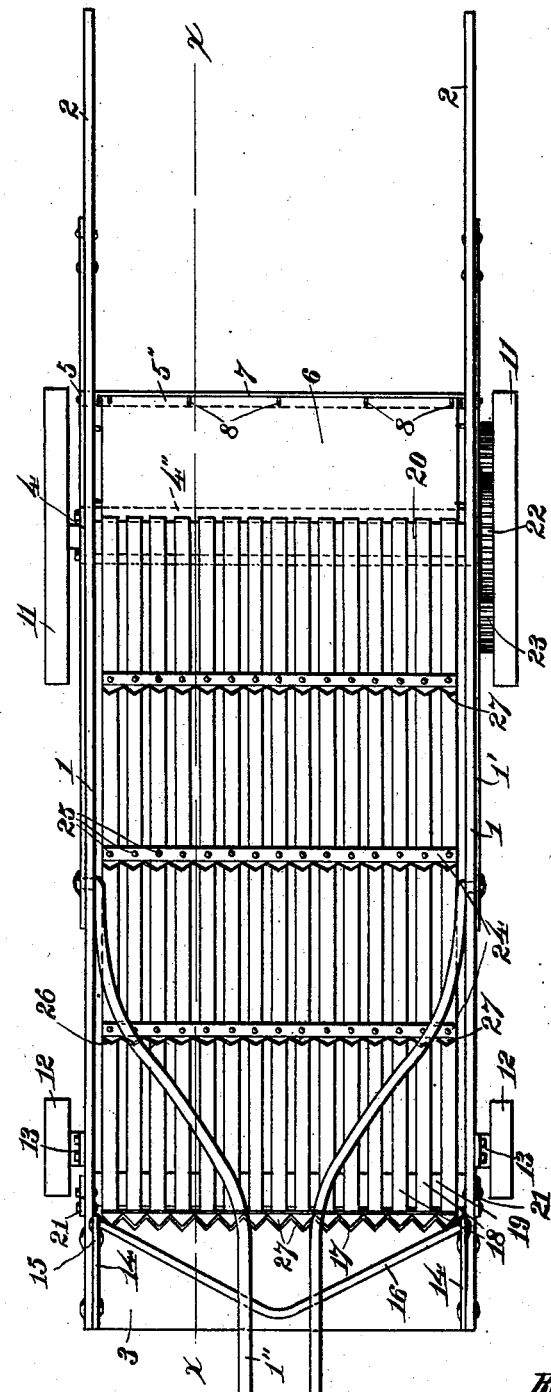

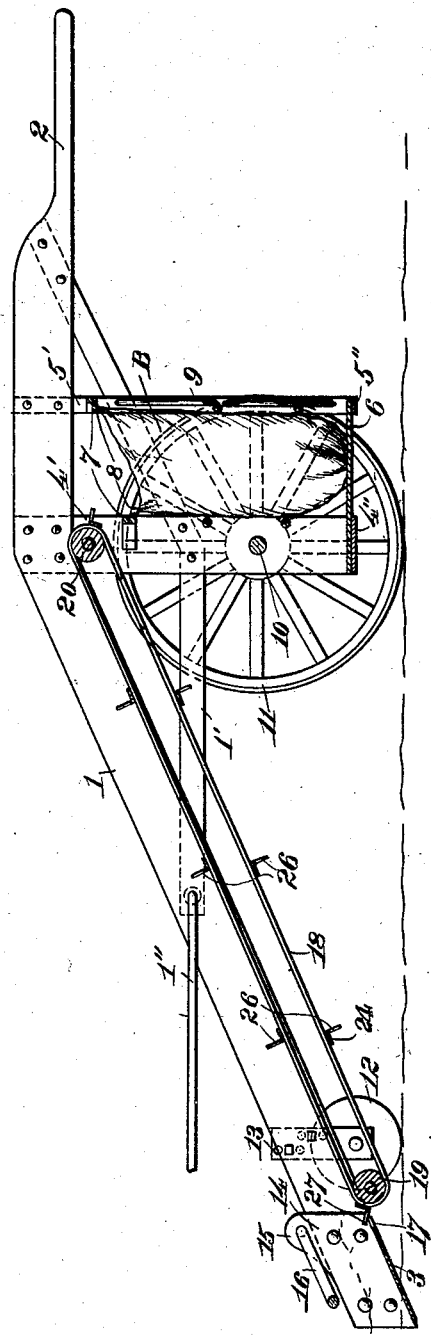

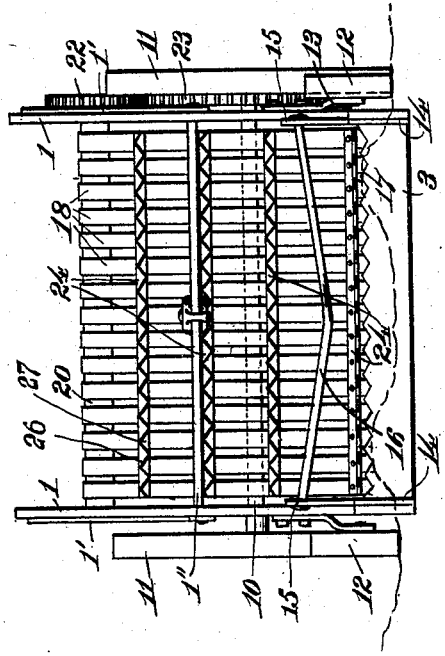
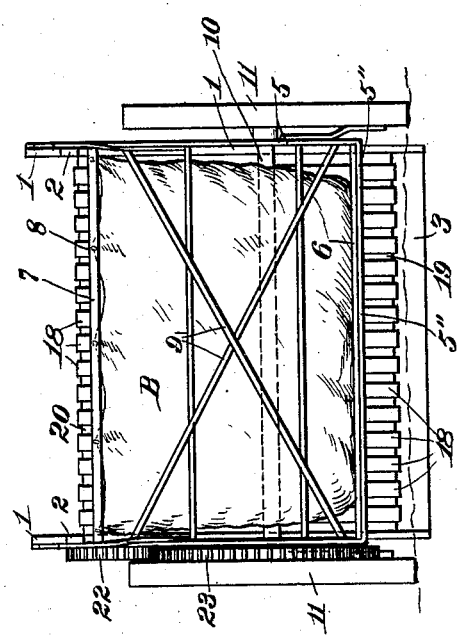

UNITED STATES PATENT OFFICE.

ROBERT BLAIR, OF CHICAGO, ILLINOIS.

POTATO-DIGGER.

No. 889,653.  Specification of Letters Patent.  Patented June 2, 1908.

Application filed September 16, 1907. Serial No. 392,961.

*To all whom it may concern:*

Be it known that I, ROBERT BLAIR, a citizen of the United States, residing at Chicago, in the county of Cook and State of Illinois, have invented certain new and useful Improvements in Potato-Diggers, of which the following is a specification.

My invention relates to potato diggers and particularly to that class thereof which are adapted to remove the potatoes from the hills, separate them from the adhering dirt, stock and weeds and deposit them in the sacks carried by the machine.

The object of my invention is to provide a potato digger which will rapidly and effectually remove the potatoes from the hills, separate those of commercial size from the small ones, the dirt, stock and weeds, and deposit them in sacks carried by the machine.
A further object of my invention is to provide a potato digger, as mentioned, which may be adjusted to dig more or less deeply according to the depth to which the potatoes have grown.
A further object is to provide a potato digger as mentioned, which will be light, strong and durable, of simple construction and of low cost to manufacture.

Other objects will appear hereinafter.
With these objects in view my invention consists generally in a potato digger comprising a suitable frame, mounted upon wheels, a shovel blade fixed to the forward end of said frame and adapted to remove the potato plant and the adjacent dirt from the hill, a bar arranged above said shovel and adapted to catch the stock and weeds, an endless conveyer extending rearwardly from said shovel and means on said conveyer for separating the potatoes from the stock held by said bar, said bar being arranged to discharge the stock and weeds from the side of the machine, and the endless conveyer being of such construction as to permit the potatoes which are too small for use and the dirt to fall through to the ground.

My invention further consists in various details of construction and arrangements of parts, all as will be hereinafter fully described and particularly pointed out in the claims.

My invention will be more readily understood by reference to the accompanying drawings forming a part of this specification and in which, Figure 1 is a side elevation of a potato digger embodying my invention in its preferred form, Fig. 2 is a plan view thereof, Fig. 3 is a vertical longitudinal section on the line x—x of Fig. 2, Fig. 4 is a front elevation, and Fig. 5 is a rear elevation, illustrating a receiving bag in place.

In the drawings, I have illustrated a potato digger, of sufficient width to dig two rows of potatoes at a time, but it is evident that it may be constructed of proper width to dig one, or more rows without departing from the spirit of my invention.

Referring to the drawings, 1—1 indicate the side members of the machine. These constitute the principal members of the frame, and extend from the extreme forward end to the rear, terminating in the handles, 2. The members, 1 are connected at their forward ends by the shovel blade, 3 and from thence extend upwardly and rearwardly until they are a sufficient distance from the ground, and extend horizontally for the remainder of their length. The endless conveyer is arranged between the inclined portions of the members, 1, and a cage for holding the receiving bag is arranged to depend from the horizontal portions. The frame of the cage is formed of the members, 4 and 5. These comprise the vertical side portions, 4' and 5' respectively, riveted at their upper ends to the members, 1 and connected at their bottom ends by the cross portions 4'' and 5'' upon which rests the bottom board or bag platform, 6.

7 indicate cross members extending between the vertical portions of the cage members and provided with a plurality of hooks, 8, to which the upper end of the bag is connected to hold it open and in position to receive the potatoes. The cage is completed by the rods, 9 which prevent the bags from sagging to such an extent as to tear loose from the hooks, 8. The members, 4 afford bearings for the axle, 10 of the main wheels, 11. The forward end of the machine is supported by the wheels, 12. These are mounted upon brackets, 13 adjustably secured to the side members, 1. By adjusting the brackets, 13 vertically upon the members, 1, the shovel blade, 3 may be adjusted to dig to any depth desired.

1' indicates a brace bar extending horizontally from the inclined portion of the side members, 1 to the members 4, and then bent upwardly and secured to the horizontal portions in proximity to the handles, 2.

1'' indicates the draft member which is secured to the members, 1, and to the forward ends of the brace bars, 1'. By this construction the strain is distributed uniformly throughout the frame.

The shovel blade, 3 is provided with vertical side portions, 14, by which it is secured to the frame members, 1. The portions, 14 are preferably formed with lugs, 15 which extend above the members, 1, and to these lugs are attached a rod, 16. Although I prefer to attach the rod, 16 to the lugs on the blade, 3, I may secure them directly to the frame members, 1. The rod, 16 is preferably bent as shown, and catches the stock of the potato plants and the weeds. After the potatoes are removed, the stock and the weeds are forced to the side of the machine and ejected therefrom. The rear edge of the blade, 3 is serrated as at 17 to coöperate with devices on the conveyer to separate the potatoes from the stock.

The conveyer comprises a plurality of endless belts 18, arranged upon rollers, 19 and 20. The roller, 19 has bearings, in brackets, 21, fixed to the members, 1 near their forward ends, and the roller 20 has bearings in the member, 4. By this arrangement the upper lap of the conveyer is approximately on a plane with the bottom edges of the sides, 1 and said sides constitute means for preventing the potatoes from rolling off the sides of the conveyer. The conveyer is driven by a pinion, 22 secured to the shaft of the roller, 20 and meshing with the gear, 23, fixed upon one of the wheels, 11. The belts, 18 are spaced a sufficient distance apart to permit the potatoes which are too small for use to drop between them, but close enough to retain all those which are of commercial or usable size.

Extending transversely across the belts and at regular intervals are the bars, 24. These are riveted to the several belts, as by rivets, 25 and are formed with an upturned flange, 26 having a serrated edge, 27 to coöperate with the serrated edge, 17, of the blade, 3. As the potatoes are dug up by the blade, 3 a considerable quantity of dirt is also scooped up, and the potatoes and dirt are constantly pushed toward the conveyer by the constant entrance of more potatoes and dirt. The stalks of the potato plants are caught and held by the bar, 16 and the serrated members on the conveyer strip the potatoes from the stock and carry them together with a quantity of dirt upwardly on the conveyer belts. In passing upwardly on the conveyer the loosened dirt and such potatoes as are too small for use drop through between the belts to the ground. The larger potatoes are carried to the top of the conveyer and deposited in the bag, B, fixed within the cage. As soon as one bag is filled it is removed and an empty bag fixed in position and the operation repeated.

Having described my invention what I claim as new and desire to secure by Letters Patent is:

1. In a potato digger, a frame, a pair of side frame members extending from the forward to the rear end of the machine in combination with a shovel blade arranged between the forward ends of said side members and having vertical side portions by which it is secured to said side members said side portions extending above said members, a bar arranged above said blade and secured to the upper ends of the side portions thereof and means for regulating the position of said blade and said bar with relation to the surface of the ground, substantially as described.

2. In a potato digger, a frame mounted upon wheels in combination with a shovel blade fixed to the forward end of said frame, a plurality of parallel endless conveyer belts extending upwardly and rearwardly from said shovel, a plurality of bars arranged at intervals across said conveyer belt and connected thereto, said bars being provided with upturned flanges having serrated edges, the rear edge of said shovel blade being correspondingly serrated, substantially as described.

3. In a potato digger, a frame mounted upon wheels, in combination with a shovel blade fixed to the forward end of said frame, a bar arranged above said blade and adapted to catch and hold the stock and weeds until the potatoes are removed from the stock and an endless conveyer comprising a plurality of endless belts and a plurality of transverse members fixed to said belts and spacing them apart, said members comprising a metal bar riveted to said belts and provided with an upturned flange having a serrated edge adapted to remove the potatoes from the stock, substantially as described.

In testimony whereof, I have signed my name to this specification in the presence of two subscribing witnesses.

ROBERT BLAIR.

Witnesses:
  HELEN F. LILLIS,
  F. E. SHEEHY.